US012661829B2

(12) United States Patent
Blom-Schieber et al.

(10) Patent No.: US 12,661,829 B2
(45) Date of Patent: Jun. 23, 2026

(54) TRANSVERSE TENSIONING SYSTEM AND METHOD FOR CONTINUOUS COMPRESSION MOLDING OF A STACK OF PLIES

(71) Applicant: The Boeing Company, Arlington, VA (US)

(72) Inventors: Adriana Willempje Blom-Schieber, Snohomish, WA (US); Jack Edward Schieber, Snohomish, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/736,096

(22) Filed: Jun. 6, 2024

(65) Prior Publication Data

US 2024/0316827 A1 Sep. 26, 2024

Related U.S. Application Data

(62) Division of application No. 17/574,935, filed on Jan. 13, 2022, now Pat. No. 12,036,701.

(Continued)

(51) Int. Cl.
| | |
|---|---|
| *B29B 11/12* | (2006.01) |
| *B29C 33/42* | (2006.01) |
| *B29C 43/22* | (2006.01) |
| *B29C 43/28* | (2006.01) |
| *B29C 43/30* | (2006.01) |
| *B29C 43/34* | (2006.01) |

(Continued)

(52) U.S. Cl.
CPC ............ *B29B 11/12* (2013.01); *B29C 43/222* (2013.01); *B29C 43/224* (2013.01); *B29C 43/28* (2013.01); *B29C 43/305* (2013.01);

*B29C 43/34* (2013.01); *B29C 70/34* (2013.01); *B29C 70/46* (2013.01); *B29C 70/526* (2013.01); *B29C 70/54* (2013.01); *B29C 2033/422* (2013.01); *B29K 2101/12* (2013.01); *B29K 2701/12* (2013.01); *B29L 2031/3076* (2013.01)

(58) Field of Classification Search
CPC ................................ B29C 43/30; B29C 43/22
See application file for complete search history.

(56) References Cited

U.S. PATENT DOCUMENTS

| | | | | |
|---|---|---|---|---|
| 3,791,567 A | * | 2/1974 | Schott, Jr. ............. | B29C 51/261 226/149 |
| 5,026,514 A | * | 6/1991 | Hauwiller .......... | B29D 99/0003 264/258 |

(Continued)

*Primary Examiner* — Galen H Hauth
(74) *Attorney, Agent, or Firm* — Massey Bean & Lewis

(57) ABSTRACT

Disclosed herein is a transverse tensioning system that comprises a left-side clamping assembly comprising a first left-side clamp element and a second left-side clamp element. The first left-side clamp element and the second left-side clamp element clamp down on the left edge portion of the stack of plies when the stack of plies moves in a feed direction and is shaped between opposing dies. The system also comprises a right-side clamping assembly, spaced apart from the left-side clamping assembly and comprising a first right-side clamp element and a second right-side clamp element. The first right-side clamp element and the second right-side clamp element clamp down on the right edge portion of the stack of plies when the stack of plies moves in the feed direction and is shaped between the opposing dies.

20 Claims, 8 Drawing Sheets

Related U.S. Application Data

(60) Provisional application No. 63/140,131, filed on Jan. 21, 2021.

(51) Int. Cl.

| | | |
|---|---|---|
| *B29C 70/34* | (2006.01) | |
| *B29C 70/46* | (2006.01) | |
| *B29C 70/52* | (2006.01) | |
| *B29C 70/54* | (2006.01) | |
| *B29K 101/12* | (2006.01) | |
| *B29K 701/12* | (2006.01) | |
| *B29L 31/30* | (2006.01) | |

(56)           References Cited

U.S. PATENT DOCUMENTS

| | | | | |
|---|---|---|---|---|
| 9,352,518 | B2 | 5/2016 | Prebil et al. | |
| 10,737,411 | B1 * | 8/2020 | Hundley ............. | B29C 35/0805 |
| 2006/0012075 | A1 * | 1/2006 | Spengler ................. | B29C 43/36 |
| | | | | 264/320 |
| 2013/0134621 | A1 * | 5/2013 | Tsotsis .................. | B29C 48/908 |
| | | | | 264/177.2 |
| 2014/0374946 | A1 * | 12/2014 | Prebil .................... | B29B 11/12 |
| | | | | 264/165 |

* cited by examiner

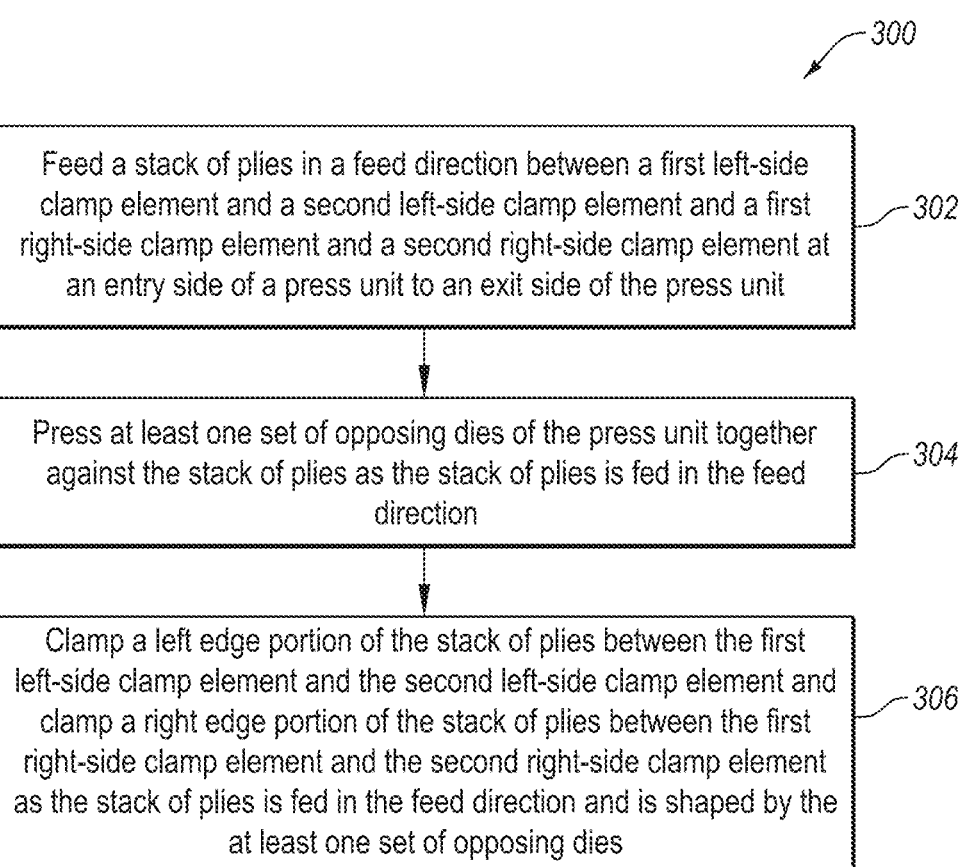

_300_

Feed a stack of plies in a feed direction between a first left-side clamp element and a second left-side clamp element and a first right-side clamp element and a second right-side clamp element at an entry side of a press unit to an exit side of the press unit — _302_

Press at least one set of opposing dies of the press unit together against the stack of plies as the stack of plies is fed in the feed direction — _304_

Clamp a left edge portion of the stack of plies between the first left-side clamp element and the second left-side clamp element and clamp a right edge portion of the stack of plies between the first right-side clamp element and the second right-side clamp element as the stack of plies is fed in the feed direction and is shaped by the at least one set of opposing dies — _306_

FIG. 11

TRANSVERSE TENSIONING SYSTEM AND METHOD FOR CONTINUOUS COMPRESSION MOLDING OF A STACK OF PLIES

FIELD

This disclosure relates generally to a transverse tensioning system, and more particularly to a transverse tensioning system used during a continuous compression molding process.

BACKGROUND

Numerous processes exist for fabricating fiber-reinforced thermoplastic composite parts. In addition to non-continuous processes such as pressing, stamping and consolidating in an autoclave, there are continuous processes, such as continuous compression molding. According to one continuous compression molding technique, a thermoplastic composite part is continuously or semi-continuously moved through a system with a series of compressing and/or shaping units performing the compression molding process.

In a continuous compression molding (CCM) process for fabricating thermoplastic composite parts, one or more unconsolidated fiber-reinforced thermoplastic plies are consolidated in a lineal process to form a single, pressed and integrated thermoplastic composite part. Typically, the CCM process provides tension along the length of the thermoplastic plies but does not provide tension in a transverse direction. Tension, in only the lengthwise direction, may cause wrinkles to form in the final thermoplastic composite part, which reduces part quality and increases scrap rate and production costs. An improved tensioning system and method that provides tension in a transverse direction is desirable.

SUMMARY

The subject matter of the present application provides examples of a transverse tensioning system and method that overcome the above-discussed shortcomings of prior art techniques. The subject matter of the present application has been developed in response to the present state of the art, and in particular, in response to shortcomings of conventional continuous compression molding processes.

Disclosed herein is a transverse tensioning system for continuous compression molding of a stack of plies. The stack of plies moves in a feed direction while being shaped between opposing dies. The transverse tensioning system comprises a left-side clamping assembly, comprising a first left-side clamp element and a second left-side clamp element. The first left-side clamp element and the second left-side clamp element are located relative to a left edge portion of the stack of plies and spaced relative to each other to clamp down on the left edge portion of the stack of plies when the stack of plies moves in the feed direction and is shaped between the opposing dies. The transverse tensioning system also comprises a right-side clamping assembly, spaced apart from the left-side clamping assembly and comprising a first right-side clamp element and a second right-side clamp element. The first right-side clamp element and the second right-side clamp element are located relative to a right edge portion of the stack of plies and spaced relative to each other to clamp down on the right edge portion of the stack of plies when the stack of plies moves in the feed direction and is shaped between the opposing dies. The preceding subject matter of this paragraph characterizes example 1 of the present disclosure.

At least one of the first left-side clamp element and the second left-side clamp element comprises a plurality of left-side rollers and a left-side track that is frictionally engageable with the left edge portion of the stack of plies and movable along the plurality of left-side rollers when frictionally engaged with the left edge portion of the stack of plies. Additionally, at least one of the first right-side clamp element and the second right-side clamp element comprises a plurality of right-side rollers and a right-side track that is frictionally engageable with the right edge portion of the stack of plies and movable along the plurality of right-side rollers when frictionally engaged with the right edge portion of the stack of plies. The preceding subject matter of this paragraph characterizes example 2 of the present disclosure, wherein example 2 also includes the subject matter according to example 1, above.

The first left-side clamp element comprises the plurality of left-side rollers and the left-side track. The second left-side clamp element comprises a left-side fixed surface. The left edge portion of the stack of plies is clamped between the left-side track and the left-side fixed surface when the stack of plies moves in the feed direction and is shaped between the opposing dies. Additionally, the first right-side clamp element comprises the plurality of right-side rollers and the right-side track, and second right-side clamp element comprises a right-side fixed surface. The right edge portion of the stack of plies is clamped between the right-side track and the right-side fixed surface when the stack of plies moves in the feed direction and is shaped between the opposing dies. The preceding subject matter of this paragraph characterizes example 3 of the present disclosure, wherein example 3 also includes the subject matter according to example 2, above.

Alternately, each one of the first left-side clamp element and the second left-side clamp element comprises a plurality of left-side rollers and a left-side track that is frictionally engageable with the left edge portion of the stack of plies and movable along the plurality of left-side rollers when frictionally engaged with the left edge portion of the stack of plies. The left edge portion of the stack of plies is clamped between the left-side tracks when the stack of plies moves in the feed direction and is shaped between the opposing dies. Additionally, each one of the first right-side clamp element and the second right-side clamp element comprises a plurality of right-side rollers and a right-side track that is frictionally engageable with the right edge portion of the stack of plies and movable along the plurality of right-side rollers when frictionally engaged with the right edge portion of the stack of plies. The right edge portion of the stack of plies is clamped between the right-side tracks when the stack of plies moves in the feed direction and is shaped between the opposing dies. The preceding subject matter of this paragraph characterizes example 4 of the present disclosure, wherein example 4 also includes the subject matter according to example 2, above.

Each roller of the plurality of left-side rollers and each roller of the plurality of right-side rollers is cylindrically shaped. The preceding subject matter of this paragraph characterizes example 5 of the present disclosure, wherein example 5 also includes the subject matter according to any one of examples 2-4, above.

Each roller of the plurality of left-side rollers of the first left-side clamp element is conically shaped and tapers in a first direction and each roller of the plurality of left-side rollers on the second left-side clamp element is conically shaped and tapers in a second direction, which is opposite of the first direction. Additionally, each roller of the plurality of right-side rollers of the first right-side clamp element is conically shaped and tapers in the first direction and each roller of the plurality of right-side rollers on the second right-side clamp element is conically shaped and tapers in the second direction. The preceding subject matter of this paragraph characterizes example 6 of the present disclosure, wherein example 6 also includes the subject matter according to any one of examples 2-4, above.

The rollers of the plurality of left-side rollers and the rollers of the plurality of right-side rollers are uniformly sized. The preceding subject matter of this paragraph characterizes example 7 of the present disclosure, wherein example 7 also includes the subject matter according to example 6, above.

The left-side track comprises grip elements that are frictionally engageable with the left edge portion of the stack of plies. Additionally, the right-side track comprises grip elements that are frictionally engageable with the right edge portion of the stack of plies. The preceding subject matter of this paragraph characterizes example 8 of the present disclosure, wherein example 8 also includes the subject matter according to any one of examples 2-7, above.

The first left-side clamp element and the second left-side clamp element are selectively movable to adjust at least one of a distance or a pressure between each other. Additionally, the first right-side clamp element and the second right-side clamp element are selectively movable to adjust at least one of a distance or a pressure between each other. The preceding subject matter of this paragraph characterizes example 9 of the present disclosure, wherein example 9 also includes the subject matter according to any one of examples 1-8, above.

Each roller of the plurality of left-side rollers is individually and selectively movable to adjust at least one of a distance of the roller toward or away from the stack of plies or a pressure between the roller and the stack of plies. Additionally, each roller of the plurality of right-side rollers is individually and selectively movable to adjust at least one of a distance of the roller toward or away from the stack of plies or a pressure between the roller and the stack of plies. The preceding subject matter of this paragraph characterizes example 10 of the present disclosure, wherein example 10 also includes the subject matter according to any one of examples 2-9, above.

Further disclosed herein is a system for continuous compression molding of a stack of plies. The system comprising a press unit comprising an entry side and an exit side. The press unit is configured to move the stack of plies in a feed direction from the entry side to the exit side. The system also comprises opposing dies having complimentary surfaces movable toward and away from the stack of plies that shape the stack of plies as the stack of plies moves in the feed direction. The system further comprises a transverse tensioning system. The transverse tensioning system comprises a left-side clamping assembly, comprising a first left-side clamp element and a second left-side clamp element. The first left-side clamp element and the second left-side clamp element are located relative to a left edge portion of the stack of plies and spaced relative to each other to clamp down on the left edge portion of the stack of plies when the stack of plies moves in the feed direction. Additionally, the transverse tensioning system comprises a right-side clamping assembly, comprising a first right-side clamp element and a second right-side clamp element. The first right-side clamp element and the second right-side clamp element are located relative to a right edge portion of the stack of plies and spaced relative to each other to clamp down on the right edge portion of the stack of plies when the stack of plies moves in the feed direction. The preceding subject matter of this paragraph characterizes example 11 of the present disclosure.

The left-side clamping assembly and the right-side clamping assembly extend parallel to each other along at least a length of the press unit. The left-side clamping assembly is spaced apart from the right-side clamping assembly by at least a width of the at least one set of opposing dies. The preceding subject matter of this paragraph characterizes example 12 of the present disclosure, wherein example 12 also includes the subject matter according to example 11, above.

The left-side clamping assembly is pivotably attached to the press unit. The left-side clamping assembly is selectively movable to adjust an angle of the left-side clamping assembly, relative to the stack of plies. Additionally, the right-side clamping assembly is pivotably attached to the press unit. The right-side clamping assembly is selectively movable to adjust an angle of the right-side clamping assembly, relative to the stack of plies. The preceding subject matter of this paragraph characterizes example 13 of the present disclosure, wherein example 13 also includes the subject matter according to any one of examples 11-12, above.

The left-side clamping assembly is movably attached to the press unit. The left-side clamping assembly is selectively movable to adjust a location of the left-side clamping assembly, relative to the at least one set of opposing dies. Additionally, the right-side clamping assembly is movably attached to the press unit. The right-side clamping assembly is selectively movable to adjust a location of the right-side clamping assembly, relative to the at least one set of opposing dies. The preceding subject matter of this paragraph characterizes example 14 of the present disclosure, wherein example 14 also includes the subject matter according to any one of examples 11-13, above.

Each one of the first left-side clamp element and the second left-side clamp element comprises a plurality of left-side rollers and a left-side track that is frictionally engageable with the left edge portion of the stack of plies and movable along the plurality of left-side rollers when frictionally engaged with the left edge portion of the stack of plies. The left edge portion of the stack of plies is clamped between the left-side tracks when the stack of plies moves in the feed direction between the entry side and the exit side of the press unit. Additionally, each one of the first right-side clamp element and the second right-side clamp element comprises a plurality of right-side rollers and a right-side track that is frictionally engageable with the right edge portion of the stack of plies and movable along the plurality of right-side rollers when frictionally engaged with the left edge portion of the stack of plies. The right edge portion of the stack of plies is clamped between the right-side tracks when the stack of plies moves in the feed direction between the entry side and the exit side of the press unit. The preceding subject matter of this paragraph characterizes example 15 of the present disclosure, wherein example 15 also includes the subject matter according to any one of examples 11-14, above.

At least one roller, located nearest to the entry side of the press unit, on the left-side clamping assembly is offset from the remaining rollers of the plurality of left-side rollers, the remaining rollers of the plurality located closer than the at least one roller to the stack of plies. Additionally, at least one roller, located nearest to the entry side of the press unit, on the right-side clamping assembly is offset from the remaining rollers of the plurality of right-side rollers, the remaining rollers of the plurality located closer than the at least one roller to the stack of plies. The preceding subject matter of this paragraph characterizes example 16 of the present disclosure, wherein example 16 also includes the subject matter according to example 15, above.

Each roller of the plurality of left-side rollers of the first left-side clamp element is conically shaped. The rollers taper in a first direction. Each roller of the plurality of left-side rollers on the second left-side clamp element is conically shaped. The rollers taper in a second direction, which is opposite of the first direction. A taper angle of the plurality of left-side rollers varies such that the rollers at the entry side of the press unit are at a first taper angle and the taper angle gradually changes along the length of the press unit to a final taper angle at the exit side of the press unit. Additionally, each roller of the plurality of right-side rollers of the first right-side clamp element is conically shaped. The rollers taper in the first direction. Each roller of the plurality of right-side rollers on the second right-side clamp element is conically shaped. The rollers taper in the second direction, which is opposite of the first direction. A taper angle of the plurality of right-side rollers varies such that the rollers at the entry side of the press unit are at the first taper angle and the taper angle gradually changes along the length of the press unit to the final taper angle at the exit side of the press unit. The preceding subject matter of this paragraph characterizes example 17 of the present disclosure, wherein example 17 also includes the subject matter according to any one of examples 15-16, above.

Additionally, disclosed herein is a method for continuous compression molding of a stack of plies. The method comprises feeding a stack of plies in a feed direction between a first left-side clamp element and a second left-side clamp element of a left-side clamping assembly and between a first right-side clamp element and a second right-side clamp element of a right-side clamping assembly at an entry side of a press unit to an exit side of the press unit. The method also comprises pressing at least one set of opposing dies of the press unit together against the stack of plies, as the stack of plies is fed in the feed direction. Complimentary forming surfaces of the at least one set of opposing dies shape the stack of plies as the stack of plies is fed in the feed direction. The method further comprises clamping a left edge portion of the stack of plies between the first left-side clamp element and the second left-side clamp element and clamping a right edge portion of the stack of plies between the first right-side clamp element and the second right-side clamp element as the stack of plies is fed in the feed direction. Tension in the stack of plies is maintained as the stack of plies is shaped by the at least one set of opposing dies. The preceding subject matter of this paragraph characterizes example 18 of the present disclosure.

The method also comprises adjusting at least one of a distance or a pressure between the first left-side clamp element and the second left-side clamp element to adjust the tension in the stack of plies. Additionally, the method comprises adjusting at least one of a distance or a pressure between the first right-side clamp element and the second right-side clamp element to adjust the tension in the stack of plies. The preceding subject matter of this paragraph characterizes example 19 of the present disclosure, wherein example 19 also includes the subject matter according to example 18, above.

Each one of the first left-side clamp element and the second left-side clamp element comprises a plurality of left-side rollers and a left-side track that is frictionally engageable with the left edge portion of the stack of plies and movable along the plurality of left-side rollers when frictionally engaged with the left edge portion of the stack of plies. Each roller of the plurality of left-side rollers is individually and selectively movable. Additionally, each one of the first right-side clamp element and the second right-side clamp element comprises a plurality of right-side rollers and a right-side track that is frictionally engageable with the right edge portion of the stack of plies and movable along the plurality of right-side rollers when frictionally engaged with the right edge portion of the stack of plies. Each roller of the plurality of right-side rollers are individually and selectively movable. The method further comprises adjusting at least one of a distance of at least one roller from any of the plurality of left-side rollers toward or away from the stack of plies or a pressure between the at least one roller and the stack of plies to adjust the tension in the stack of plies. Additionally, the method comprises adjusting at least one of a distance of at least one roller from any of the plurality of right-side rollers toward or away from the stack of plies or a pressure between the at least one roller and the stack of plies to adjust the tension in the stack of plies. The preceding subject matter of this paragraph characterizes example 20 of the present disclosure, wherein example 20 also includes the subject matter according to any one of examples 18-19, above.

The method further comprises trimming off at least a portion of the stack of plies fed through the left-side clamping assembly and the right-side clamping assembly to form a part. The preceding subject matter of this paragraph characterizes example 21 of the present disclosure, wherein example 21 also includes the subject matter according to any one of examples 18-20, above.

The first left-side clamp element comprises a plurality of left-side rollers and a left-side track, and the second left-side clamp element comprises a left-side fixed surface. The first right-side clamp element comprises a plurality of right-side rollers and a right-side track, and the second right-side clamp element comprises a right-side fixed surface. The step of clamping a left edge portion of the stack of plies comprises clamping the left edge portion of the stack of plies between the left-side track and the left-side fixed surface. The step of clamping the right edge portion of the stack of plies comprises clamping the right edge portion of the stack of plies between the right-side track (130B) and the right-side fixed surface (140B). The preceding subject matter of this paragraph characterizes example 22 of the present disclosure, wherein example 22 also includes the subject matter according to example 18, above.

The described features, structures, advantages, and/or characteristics of the subject matter of the present disclosure may be combined in any suitable manner in one or more examples, including embodiments and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example, embodiment, or implementation. In other instances, additional features and advantages may be recognized in certain examples, embodiments, and/or implementations that may not be present in all examples, embodiments, or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings depict only typical examples of the subject matter, they are not therefore to be considered to be limiting of its scope. The subject matter will be described and explained with additional specificity and detail through the use of the drawings, in which:

FIG. 11 is a schematic flow diagram of a method of continuous compression molding of a stack of plies, according to one or more examples of the present disclosure.

DETAILED DESCRIPTION

Reference throughout this specification to "one example," "an example," or similar language means that a particular feature, structure, or characteristic described in connection with the example is included in at least one example of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the present disclosure, however, absent an express correlation to indicate otherwise, an implementation may be associated with one or more examples.

Disclosed herein is a system that comprises a transverse tensioning system for continuous compression molding (CCM) of a stack of plies. The transverse tensioning system comprises a left-side clamping assembly and a right-side clamping assembly that work in unison to provide transverse tension to the stack of plies as it moves in a feed direction and while the stack of plies is being shaped between opposing dies. The left-side clamping assembly and the right-side clamping assembly each include two clamp elements which are spaced relative to each other to clamp down on the stack of plies at a left edge portion and a right edge portion, respectively, of the stack of plies. Accordingly, as the stack of plies is moved in the feed direction, transverse tension in the stack of plies is maintained by the left-side clamping assembly and the right-side clamping assembly. Maintaining transverse tension in the stack of plies, as the stack of plies is moved, can reduce wrinkling in the stack of plies, improve the final part quality, and reduce overall waste and part production costs.

Figure 1:
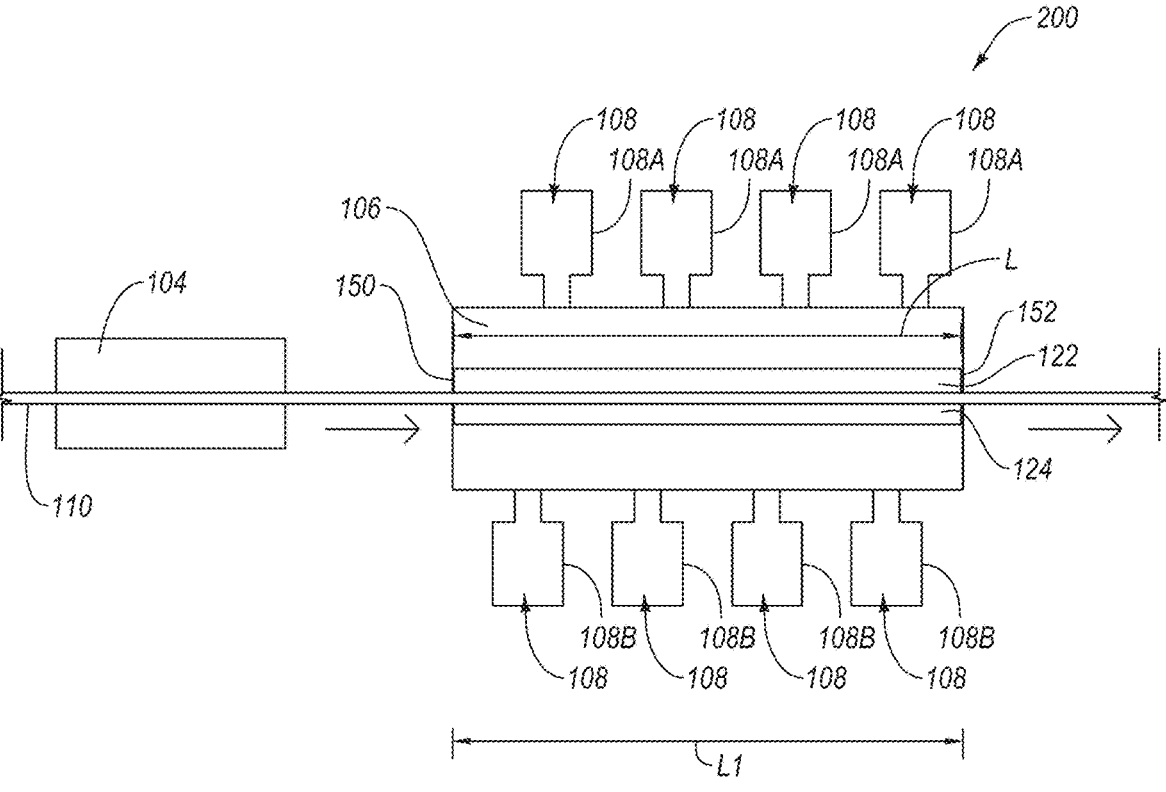
FIG. 1 is schematic side view of a system for continuous compression molding of a stack of plies, where the system has a transverse tensioning system, according to one or more examples of the present disclosure.

Referring to FIG. 1, and according to some examples, a system 200 is shown with a stack of plies 110 moving in a feed direction through the system 200 as part of a CCM process. The stack of plies 110 includes one or more unconsolidated thermoplastic plies in one example. In some examples, the stack of plies is covered on both sides with a non-stick material, such as a stainless-steel foil or Kapton layers, to reduce sticking to the forming dies. The stack of plies 110 is fed into the system 200. In some examples, the system 200 has a pre-heating and/or pre-forming unit (i.e., pre-heating/pre-forming unit 104) and a press unit 106 located in sequential relationship with respect to each other. Other units may be included to provide, for example, a curvature along the length of the parts or other shapes or features into the part's pressed shape, or the pre-heating and/or pre-forming unit 104 or press unit 106 may be configured to provide such features.

The pre-heating/pre-forming unit 104, which as indicated above, can be a pre-heating unit, a pre-forming unit, or both a pre-heating and pre-forming unit, has an intake end adapted to receive a continuous supply of the stack of plies 110, which can be made of planar thermoplastic composite plies in any defined layup, for example. The stack of plies
110 can be fed from one or more spools on which the plies
are wound. The pre-heating/pre-forming unit 104 heats the
stack of plies 110 to a temperature just below the melting
temperature of the thermoplastic material of the stack of
plies 110. Additionally, the pre-heating/pre-forming unit 104
may have forming surfaces that form the stack of plies 110
into a different shape that is the same or similar to the shape
of the final part. The pre-heating/pre-forming unit 104 may
use a variety of forming surfaces and have any design known
to those skilled in the art.

The stack of plies 110 exits the pre-heating/pre-forming
unit 104 and enters the press unit 106, where the one or
multiple plies in the stack of plies 110 are consolidated to
form a single, pressed and integrated thermoplastic compos-
ite part, using the application of heat and pressure. The stack
of plies 110 enters the press unit 106 at an entry side 150 of
the press unit 106, which is adapted to receive the stack of
plies 110 and exits the press unit 106 at an exit side 152 of
the press unit 106. In some examples, the CCM process is a
continuous process with the stack of plies 110 moving at a
constant rate through the press unit 106. In other examples,
the CCM process is a semi-continuous process with the
stack of plies 110 moving at a pulsed rate (i.e., stopping or
slowing down at specific time intervals) through the press
unit 106.

The press unit 106 includes one or more sets of opposing
dies 108. In one example, the set of opposing dies 108
include two opposing dies. In other examples, the set of
opposing dies 108 include more than two dies that work in
unison to shape an upper surface and a lower surface of the
stack of plies 110. As the stack of plies 110 moves between
the one or more sets of opposing dies 108, the stack of plies
110 is heated and the set of opposing dies 108 provide
sufficient pressure to consolidate the thermoplastic plies in
the stack of plies 110 into a desired shape and thickness.
Additional sets of opposing dies 108 may also be utilized to
gradually cool down the stack of plies 110 from a melted
state back to a solid state. In one example, the set of
opposing dies 108 has forming surfaces that match a desired
contour (e.g., shape) of the stack of plies 110 as the stack of
plies 110 moves through the press unit 106. An upper die
108A, in the set of opposing dies 108, has a forming surface
matching the contour of the upper surface of the stack of
plies 110. A lower die 108B, of the set of opposing dies 108,
has a forming surface matching the contour of the lower
surface of the stack of plies 110. In other examples, the set
of opposing dies 108 are used to shape the stack of plies 110
as it is moved through the press unit 106. The upper die
108A and the lower die 108B have complimentary forming
surfaces that change the shape of the stack of plies 110 as the
stack of plies 110 is fed in the feed direction. The stack of
plies 110 may be feed through multiple sets of opposing dies
108 that gradually change the shape of the stack of plies 110
to a desired shape. The set of opposing dies 108 may be
coupled to mechanical, electrical, hydraulic, pneumatic or
other types of actuators (not shown), which move the set of
opposing dies 108 toward and away from each other
between an open and closed position.

Figures 6A, 6B, 6C:
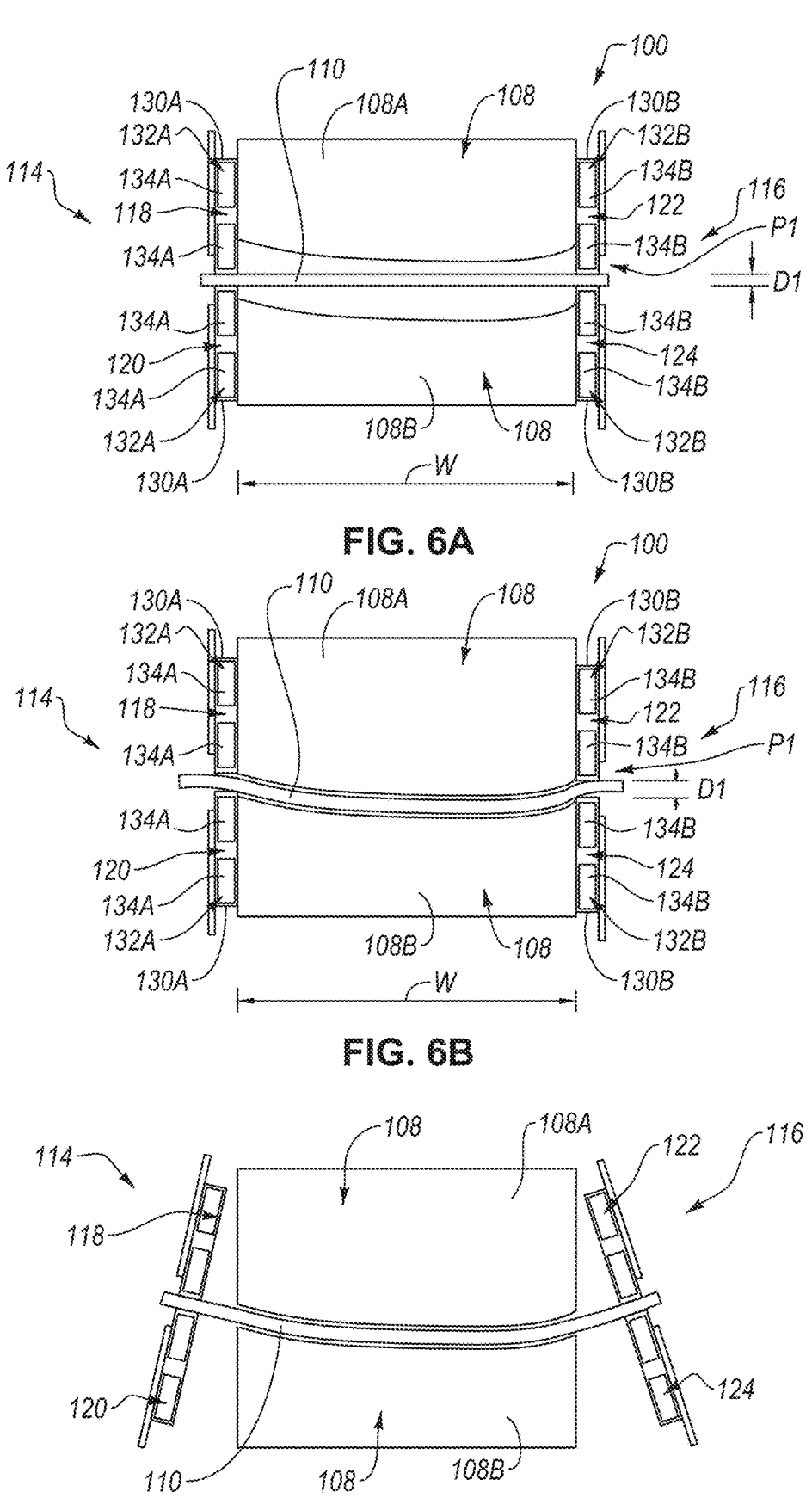
FIG. 6A is a schematic cross-sectional front view of a system for continuous compression molding of a stack of plies, with opposing dies shown away from the stack of plies, according to one or more examples of the present disclosure.
FIG. 6B is a schematic cross-sectional front view of the system of FIG. 6A, with opposing dies shown compressing the stack of plies, according to one or more examples of the present disclosure.
FIG. 6C is a schematic cross-sectional front view of a system for continuous compression molding of a stack of plies, with opposing dies shown compressing the stack of plies and clamping assemblies being pivotable relative to the opposing dies, according to one or more examples of the present disclosure.

The stack of plies 110 is advanced (e.g., pulled via a
pulling mechanism (not shown)) through the press unit 106
between two clamp assemblies, one at the right edge portion
and one at the left edge portion of the stack of plies 110 (e.g.,
see FIG. 6A). Each clamp assembly includes a first clamp
element and a second clamp element. In one example, the
first clamp element is positioned adjacent to the upper
surface of the stack of plies 110 and the second clamp element is positioned adjacent to the lower surface of the
stack of plies 110. As shown in FIG. 1, a first right-side
clamp element 122 and a second right-side clamp element
124 are located relative to the right edge portion of the stack
of plies 110 and extend a length L along the press unit 106,
which can be an entire length L1 of the press unit 106 or just
a portion of the entire length of the press unit 106. In other
examples, the first right-side clamp element 122 and the
second right-side clamp element 124 can extend a length L
that is beyond the entire length of the press unit 106, such
as extending along part of or an entire length of the pre-
heating/pre-forming unit 104 and the press unit 106 or
starting before the pre-heating/pre-forming unit 104 and
extending along the pre-heating/pre-forming unit 104 and
the press unit 106. The first right-side clamp element 122 is
positioned adjacent to an upper surface of the stack of plies
110 and the second right-side clamp element 124 is posi-
tioned adjacent to a lower surface of the stack of plies 110.
Moreover, the first right-side clamp element 122 and the
second right-side clamp element 124 are spaced relative to
each other to clamp down on the right edge portion of the
stack of plies 110. Although not shown in FIG. 1, a similar
clamp assembly is also along the left edge portion of the
stack of plies 110. The clamp assemblies work in unison to
provide transverse tension in the stack of plies 110 as the
stack of plies 110 is moved in a direction parallel to the
length L1 of the press unit 106.

Figure 2:
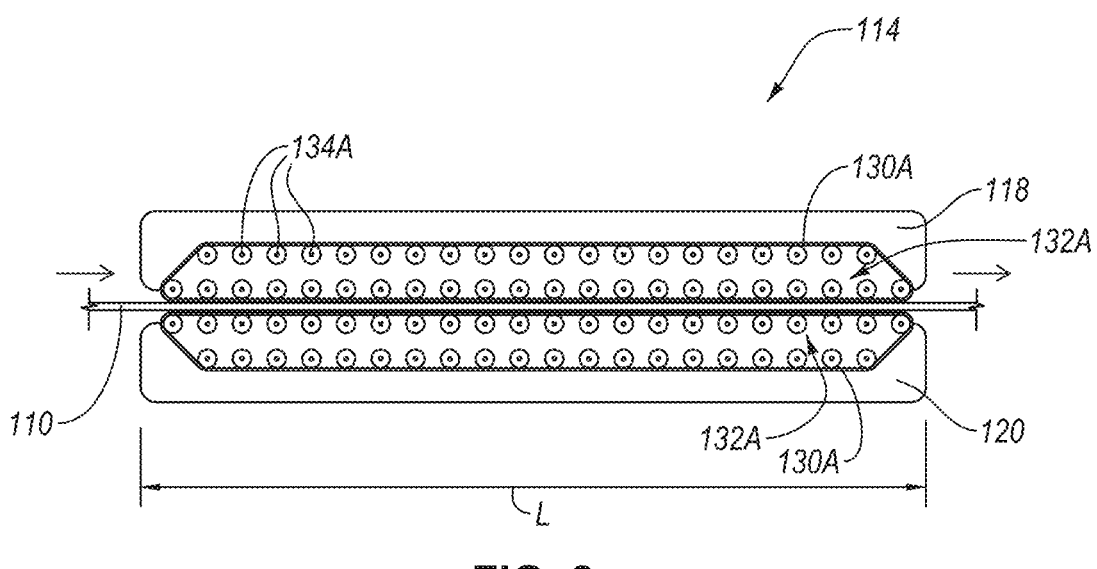
FIG. 2 is a schematic side view of a clamping assembly of a transverse tensioning system, according to one or more examples of the present disclosure.

Referring to FIG. 2, according to some examples, a
left-side clamping assembly 114 of a clamp assembly of the
system 200 is shown. Although referenced as a left-side
clamping assembly 114 throughout, a right-side clamping
assembly of the clamp assembly of the system 200 would
have the same features and be a mirrored reflection of the
left-side clamping assembly 114 (i.e., the rollers on each
clamp assembly would face each other). The left-side clamp-
ing assembly 114 includes a first left-side clamp element 118
and a second left-side clamp element 120. The first left-side
clamp element 118 and the second left-side clamp element
120 are spaced relative to each other to clamp down on a left
edge portion of the stack of plies 110 as the stack of plies 110
is moved in a feed direction. The first left-side clamp
element 118 and the second left-side clamp element 120
each include a plurality of left-side rollers 132A. The
plurality of left-side rollers 132A includes left-side rollers
134A that are at least along a length L of the left-side
clamping assembly 114. In some examples, the plurality of
left-side rollers 132A include one row of rollers that is
adjacent to the stack of plies 110. In other examples, the
plurality of left-side rollers 132A may include multiple
rows, having one row adjacent to the stack of plies 110 and
other rows used to help facilitate movement of a left-side
track 130A.

The stack of plies 110 is movable along the plurality of
left-side rollers 132A. In one example, the at least one row
of the plurality of left-side rollers 132A is in direct contact
with the stack of plies 110, with each roller 134A rotatable
in the same direction to allow the stack of plies 110 to move
in a feed direction along the plurality of left-side rollers
132A. The rollers 134A of the plurality are spaced closely
together such that the tension in the stack of plies 110 is not
sufficiently changed in the spaces between individual ones
of the rollers 134A. In other words, the rollers 134A are
spaced to allow each roller to be rotatable in the same
direction and also to maintain tension in the spaces between
the rollers 134A. In other examples, the plurality of left-side
rollers 132A includes a left-side track 130A that surrounds
the periphery of the entirety of the plurality of left-side rollers 132A and is movable along the plurality of left-side rollers 132A. The left-side track 130A is frictionally engageable with the left edge portion of the stack of plies 110. Accordingly, the left-side track 130A directly contacts the stack of plies 110 while the plurality of left-side rollers 132A facilitate movement of the left-side track 130A and provide the pressure necessary to maintain transverse tension in the stack of plies 110.

The left-side track 130A may have a flat surface that can frictionally engage the stack of plies 110 while allowing the stack of plies 110 to move in the feed direction. Alternatively, the left-side track 130A may include grip elements to increase the grip between the left-side track 130A and the stack of plies 110. Such grip elements may include but are not limited to, studs or other protrusions along the track, repeating tread pattern, etc. Grip elements may be made from the same material or a different material than the left-side track 130A.

At least the portion of the stack of plies 110 that is clamped between the plurality of left-side rollers 132A will be trimmed off, after the stack of plies 110 has exited the clamp element. Therefore, the stack of plies 110 has excess material added into the width of the stack of plies 110 to account for the material that will trimmed off, and ultimately discarded (i.e., not part of the final part), although any waste may be recyclable. While more material may be required to be trimmed from the final part then in convectional CCM processes, the transverse tensioning system helps to eliminate wrinkling in the final part and ultimately leads to less overall waste and part production costs.

Figure 3:
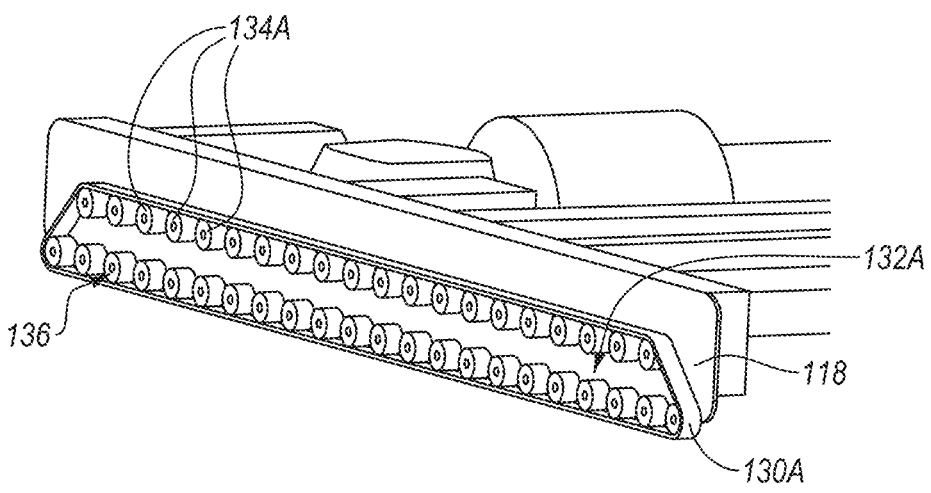
FIG. 3 is a schematic perspective view of a clamp element of a clamping assembly, according to one or more examples of the present disclosure.

As shown in FIG. 3, the rollers 134A of the plurality of left-side rollers 132A have a length and extend outwardly from the clamp element, as shown on the first left-side clamp element 118. The length of the rollers 134A is sufficient to frictionally engage a left-side portion of the stack of plies 110 and maintain tension in the stack of plies 110. In one example, the rollers 134A are uniformly and cylindrically shaped 136. In another example, the rollers 134A are conically shaped 138 (e.g., see FIG. 9). The left-side track 130A generally has the same width as the length of the rollers 134A.

Figure 4:
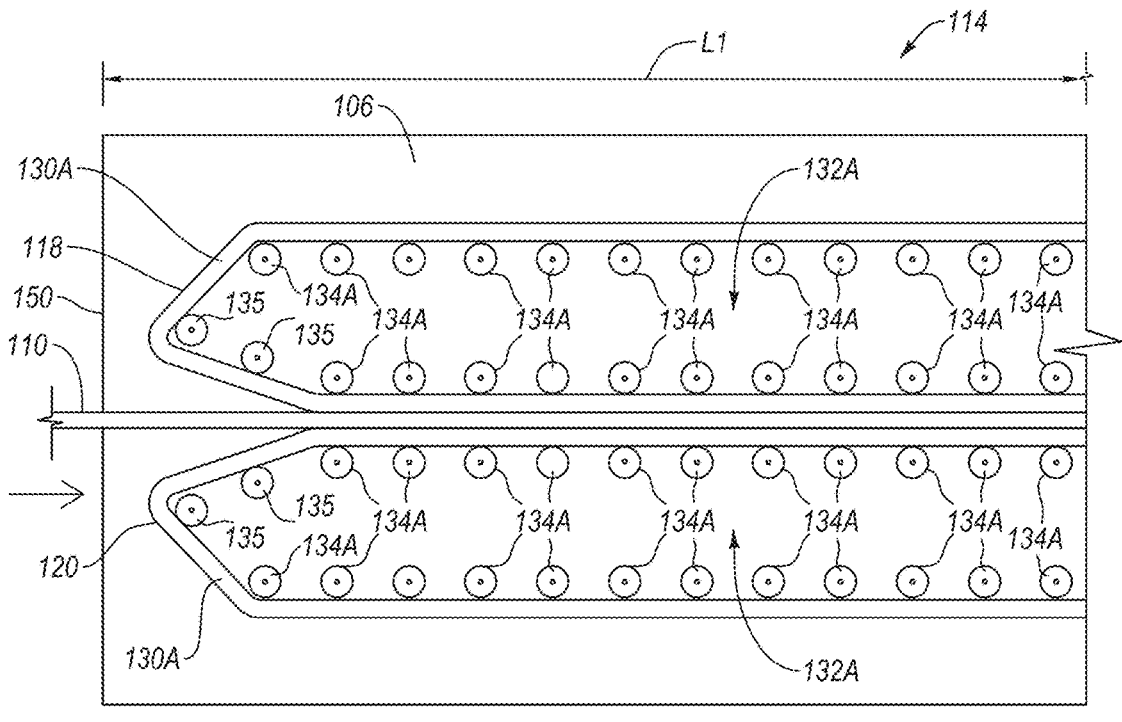
FIG. 4 is a schematic side view of a clamp element of a clamping assembly, with some rollers vertically offset from other rollers of a plurality of rollers of the clamping assembly, according to one or more examples of the present disclosure.

The entry side 150 of the press unit 106 is adapted to receive the stack of plies 110. The stack of plies 110 may be fed into the press unit 106 after exiting the outlet end of the pre-heating/pre-forming unit 104. The plurality of left-side rollers 134A may all be located at the same distance from the stack of plies 110 or the distance of individual rollers of the plurality of left-side rollers 134A from the stack of plies 110 may vary. Referring to FIG. 4, in some examples, at least one roller 135 is offset from the remaining left-side rollers 134A in the plurality of left-side rollers 132A. The rollers 135 at the beginning of the first left-side clamp element 118 are located further away from the stack of plies 110 than the remaining left-side rollers 134A of the plurality of left-side rollers 132A. In one example, the rollers 135 are located nearest to the entry side 150 of the press unit 106 when the first left-side clamp element 118 extends the length L1 of the press unit 106. In other examples, the rollers 135 are located at the beginning of the first left-side clamp element 118 which may be at any location along the CCM process, including at the beginning of the pre-heating/pre-forming unit 104 (e.g., see FIG. 1). Offsetting the rollers 135 proximate the incoming edge can help prevent mark-off on the stack of plies 110 and accommodate the bulk factor of the plies in the stack of plies 110 as it enters the left-side clamping assembly 114 (i.e., provide sufficient clearance between the left-side rollers 134A in the first left-side clamp element 118 and the left-side rollers 134A in the second left-side clamp element 120). Multiple rollers may be offset and gradually decrease to provide a gradually increasing pressure as the left-side rollers 134A on the first left-side clamp element 118 get closer to the left-side rollers 134A on the second left-side clamp element 120.

Figure 5:
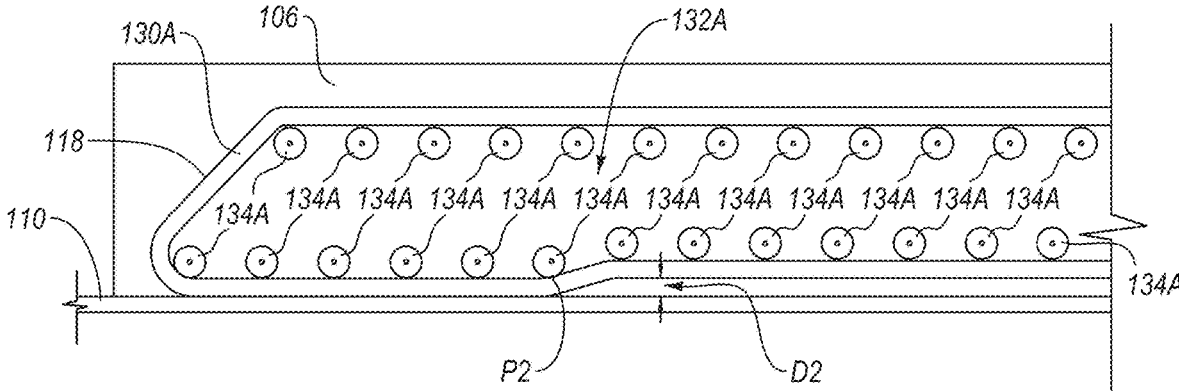
FIG. 5 is a schematic side view of a clamp element of a clamping assembly, with individual rollers that are selectively movable in relation to a stack of plies, according to one or more examples of the present disclosure.

Referring to FIG. 5, the left-side rollers 134A on the plurality of left-side rollers 132A are individually and selectively adjustable. In one example, the left-side rollers 134A may be adjusted to change a distance D2 of the left-side rollers 134A toward or away from the stack of plies 110. In another example, the rollers 134A may be adjusted to adjust a pressure P2 between the left-side rollers and the stack of plies 110, or between the left-side track 130A and the stack of plies 110. While some transverse tension is maintained in the stack of plies 110, the distance D2 or pressure P2 can be adjusted to change the amount of tension in the stack of plies 110 at a certain point along the press unit 106 by adjusting individual ones of the left-side rollers 132A. The distance D2 or pressure P2 can be adjusted to adjust for changes in the bulk of the stack of plies 110 as it moves in a feed direction along the press unit 106. The distance D2 or pressure P2 can also be adjusted to account for tension requirements in the stack of plies 110 as the stack of plies 110 changes from a solid material to a melting material or as the material is cooled.

Referring to FIGS. 6A and 6B, a cross sectional front view of a transverse tensioning system 100 is shown. The system 100 includes a left-side clamping assembly 114 and a right-side clamping assembly 116 that work in unison to provide transverse tension to a stack of plies 110. The left-side clamping assembly 114 includes a first left-side clamp element 118 and a second left-side clamp element 120 that are located relative to a left edge portion of the stack of plies 110 and clamp down on the left edge portion of the stack of plies 110. The right-side clamping assembly 116 includes a first right-side clamp element 122 and a second right-side clamp element 124 that are located relative to a right edge portion of the stack of plies 110 and clamp down on the right edge portion of the stack of plies 110.

The first left-side clamp element 118 and the second left-side clamp element 120 include a plurality of left-side rollers 132A. A left-side track 130A surrounds the periphery of the entirety of the left-side rollers 132A. Accordingly, a portion of each of the left-side tracks 130A is in direct contact with the stack of plies 110 and the plurality of left-side rollers 132A on each clamp element helps to facilitate the movement of the left-side track 130A of the respective clamp element. In other words, the left-side track 130A frictionally engages the stack of plies 110 on the left edge portion of the stack of plies 110 as it moves in a feed direction. Likewise, the first right-side clamp element 122 and the second right-side clamp element 124 include a plurality of right-side rollers 132B surrounded by a respective right-side track 130B. The plurality of right-side rollers 132B includes right-side rollers 134B that are at least along a length of the right-side clamping assembly 116. The stack of plies 110 is movable along the plurality of right-side rollers 132B. In one example, the at least one row of the plurality of right-side rollers 132B is in direct contact with the stack of plies 110, with each roller 134B rotatable in the same direction to allow the stack of plies 110 to move in a feed direction along the plurality of right-side rollers 132B. The rollers 134B of the plurality are spaced closely together such that the tension in the stack of plies 110 is not sufficiently changed in the spaces between individual ones of the rollers 134B. In other words, the rollers 134B are spaced to allow each roller to be rotatable in the same direction and also to maintain tension in the spaces between the rollers 134B. In other examples, the plurality of right-side rollers 132B includes a right-side track 130B that surrounds the periphery of the entirety of the plurality of right-side rollers 132B and is movable along the plurality of right-side rollers 132B. The right-side track 130B is frictionally engageable with the right edge portion of the stack of plies 110. Accordingly, the right-side track 130B directly contacts the stack of plies 110 while the plurality of right-side rollers 132B facilitate movement of the right-side track 130B and provide the pressure necessary to maintain transverse tension in the stack of plies 110. Accordingly, the right-side clamp elements function in the same way as the left-side clamp elements.

The first left-side clamp element 118 and the second left-side clamp element 120 are selectively movable relative to the stack of plies 110. In one example, the first left-side clamp element 118 and the second left-side clamp element 120 are adjustable to change a distance D1 between each other. In other words, in some examples, the left-side clamping assembly 114 is movably attached to the press unit 106 and the right-side clamping assembly 116 is movably attached to the press unit 106. While continuously maintaining contact with the stack of plies 110, the distance D1 can be adjusted to adjust the transverse tension at the left edge portion of the stack of plies 110. In another example, the first left-side clamp element 118 and the second left-side clamp element 120 are adjustable to change a pressure P1 between each other, without changing the distance D1 between each other. The pressure P1 may be adjusted to compress or allow expansion in the stack of plies 110. During the melting and shaping process, and the subsequent cooling process, in the stack of plies 110, the distance D1 or pressure P1 may need to be adjusted to provide enough clamping force between the clamp elements to maintain, increase, or decrease the transverse tension in the stack of plies 110. Likewise, the first right-side clamp element 122 and the second right-side clamp element 124 are also adjustable in distance D1 and pressure P1. Generally, the distance D1 or pressure P1 at any point along the press unit 106 (e.g., see FIG. 1) will be the same in the left-side clamping assembly 114 and the right-side clamping assembly 116.

As shown in FIG. 6A, a set of opposing dies 108 is in an open position (i.e., the set of opposing dies 108 is not in direct contact with the stack of plies 110). An upper die 108A and a lower die 108B have complimentary surfaces and are used to consolidate the thermoplastic plies in the stack of plies 110 into the desired shape and thickness. The upper die 108A and lower die 108B may have surfaces that match the contours of the stack of plies 110 or may be used to shape the stack of plies 110 from a flat or planar sheet to a desired shape. The contours in the upper die 108A and contours in the lower die 108B are used to shape the stack of plies 110. As shown in FIG. 6B, as the upper die 108A and lower die 108B are in a closed position (i.e., the set of opposing dies 108 is in direct contact with the stack of plies 110), the stack of plies 110 is shaped between the complimentary forming surfaces of the set of opposing dies 108. The left-side clamping assembly 114 and the right-side clamping assembly 116 of the transverse tensioning system 100 are spaced apart from each other by at least a width W of the set of opposing dies 108 to allow the opposing dies 108 to freely move between the open and closed position. As shown in FIG. 6C, the left-side clamping assembly 114 and the right-side clamping assembly 116 are pivotably attached adjacent to the press unit 106 (e.g., see FIG. 1). The clamping assemblies may be attached directly to the press unit 106 or may be a separate mechanism in the CCM process and located adjacent to the press unit 106. The left-side clamping assembly 114 and the right-side clamping assembly 116 are pivotably along a pivot axis to adjust an angle of the clamping assemblies relative to the stack of plies 110. Depending on the desired shape of the stack of plies 110 the clamping assemblies may pivot in opposite directions, as shown in FIG. 6C, or may pivot in the same direction. The clamping assemblies may be pivoted to avoid mark-offs in the left edge and right edge portion of the stack of plies 110. Additionally, or alternatively, the clamping assemblies may pivot to clamp the stack of plies 110 at a complimentary angle to the desired shape of the stack of plies 110 while the stack of plies 110 is being shaped. Generally, the left-side clamping assembly 114 and the right-side clamping assembly 116 are pivoted to the desired location before the stack of plies 110 is fed into the press unit 106. Accordingly, the left-side clamping assembly 114 and the right-side clamping assembly 116 remain at the same pivot angle, relative to the stack of plies 110, during the entire CCM process. The clamping assemblies may be pivotally adjusted to any of various angles relative to the stack of plies 110. In one example, the clamping assemblies may pivot to any angle between 0° and 90° in relation to the press unit 106.

Figure 7A:
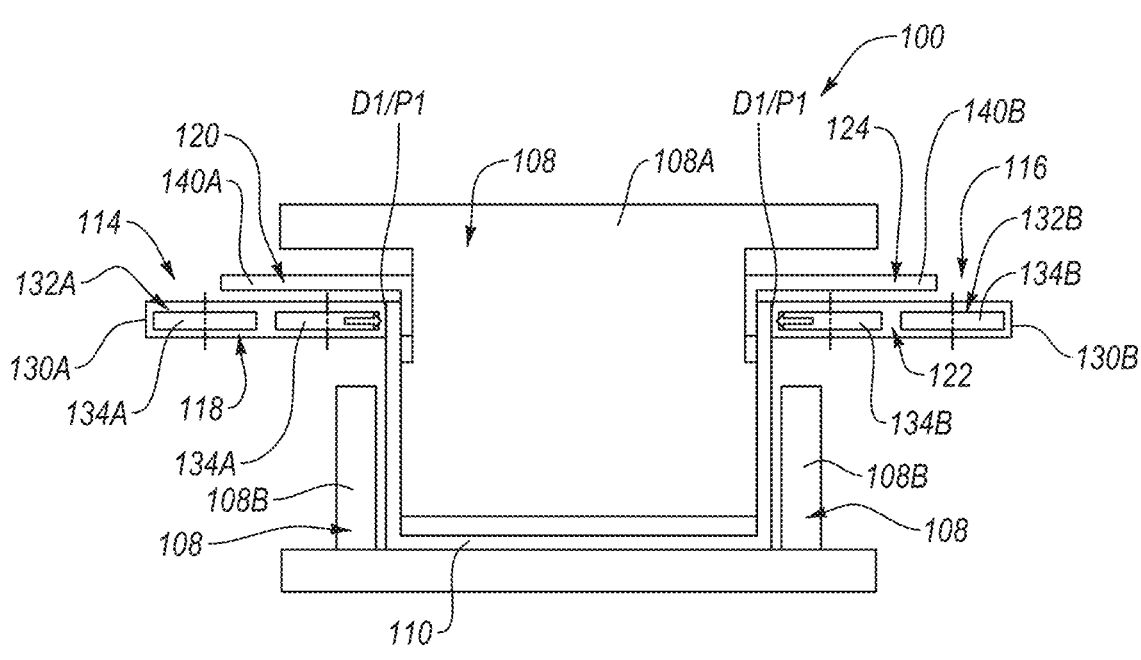
FIG. 7A is a schematic cross-sectional front view of a system for continuous compression molding of a stack of plies, with opposing dies shown away from the stack of plies, according to one or more examples of the present disclosure.
Figure 7B:
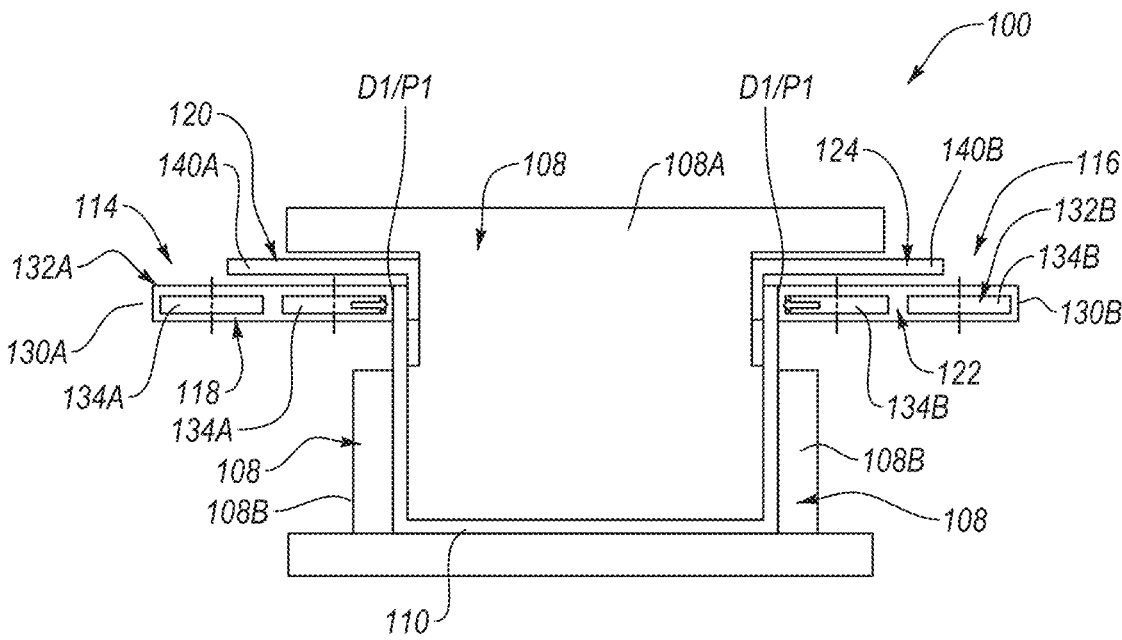
FIG. 7B is a schematic cross-sectional front view of a system of FIG. 7A, with opposing dies shown pressing toward the stack of plies, according to one or more examples of the present disclosure.

When the stack of plies 110 has a complex cross-sectional configuration, such as a cross-sectional configuration having two substantially linear portions connected by an arcuate portion, where the linear portions are substantially parallel to each other, as shown in FIG. 7A, the stack of plies 110 may not move as well through the CCM which may cause wrinkles to form in the stack of plies 110. As mentioned previously, wrinkles in the stack of plies 110 reduce part quality and increases scrap rate and production costs. A transverse tensioning system 100, as shown in FIGS. 7A and 7B, can be used to facilitate movement of the stack of plies 110 through the CCM process. The system 100 includes a left-side clamping assembly 114 and a right-side clamping assembly 116. The left-side clamping assembly further includes a first left-side clamp element 118 with a plurality of left-side rollers 132A and a left-side track 130A, and a second left-side clamp element 120 that is a left-side fixed surface 140A. The left edge portion of the stack of plies 110 is clamped between the left-side track 130A and the left-side fixed surface 140A. Likewise, the right edge portion of the stack of plies 110 is clamping between a first right-side clamp element 122 including a plurality of right-side rollers 132B and a right-side track 130B and a second right-side clamp element 124 that is a right-side fixed surface 140B. Accordingly, the left edge and right edge portion of the stack of plies 110 are clamped between a moving surface and a fixed surface (i.e., the left-side tracks 130A and 130B and the fixed surfaces 140A and 140B).

In some circumstances, depending on the desired shape of the stack of plies 110 it may not be possible to use a clamping assembly with two moving surfaces. Therefore, having one moving surface and one fixed surface may be utilized in such circumstances. In FIG. 7A, the stack of plies 110 is being shaped between a set of opposing dies 108 into a stack of plies 110 having two substantially linear portions connected by an arcuate portion, where the linear portions are substantially parallel to each other. The stack of plies 110 is fed in a feed direction as the set of opposing dies move toward and away from the stack of plies 110. The set of opposing dies 108 is in an open position, specifically an upper die 108A and two lower dies 108B are in an open position and therefore not shaping the stack of plies 110. In FIG. 7B, the set of opposing dies is in a closed position, specifically the upper die 108A and the two lower dies 108B are in a closed position and shaping the stack of plies 110. The fixed surface is frictionally engageable with the stack of plies 110 while also allowing the stack of plies 110 to move in the feed direction without slowing down or otherwise interrupting the movement of the stack of plies 110 at the left and right edges compared to the stack of plies 110 as a whole. In one example, the left-side fixed surface 140A and the right-side fixed surface 140B do not move in relation to the stack of plies 110. The first left-side clamp element 118 and the first right-side clamp element 122 can be adjusted to change the distance D1 or pressure P1 in the clamping assemblies.

Figure 8:
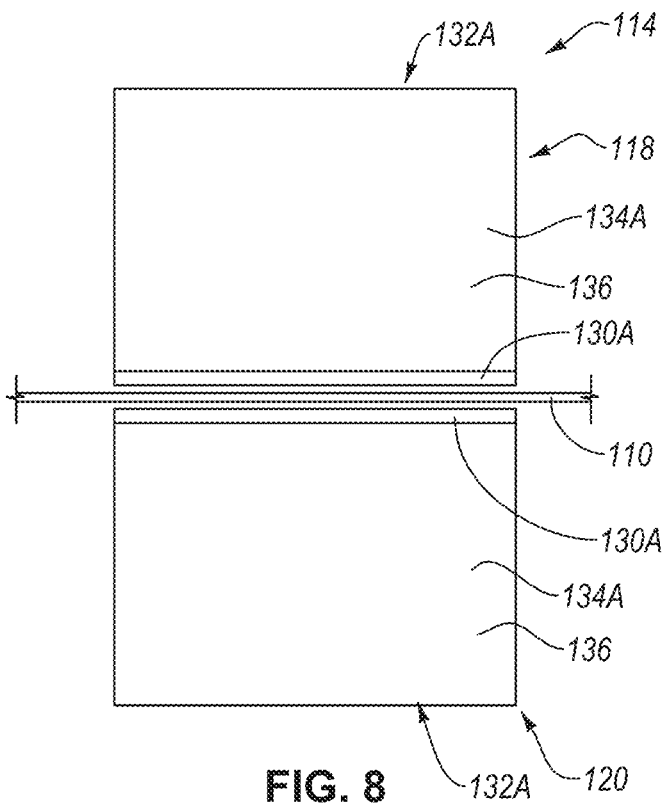
FIG. 8 is a schematic side view of a roller from a first clamp element and a roller from a second clamp element clamping a stack of plies, according to one or more examples of the present disclosure.
Figure 9:
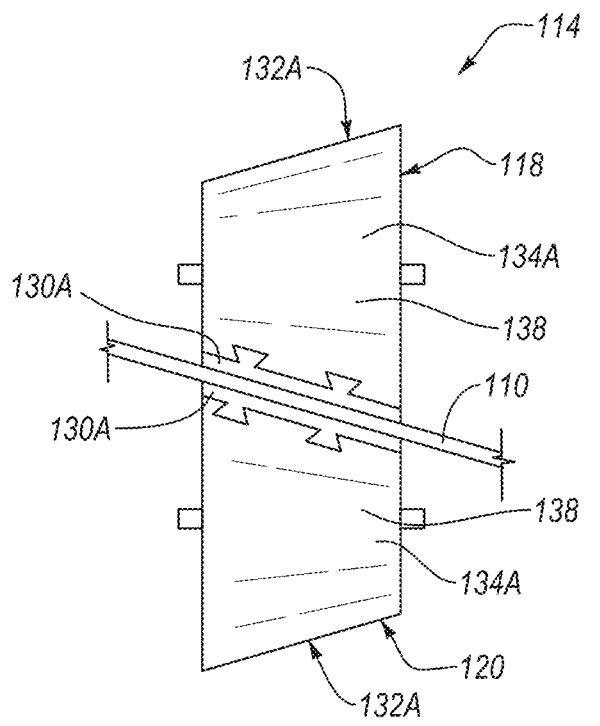
FIG. 9 is a schematic side view of a roller from a first clamp element and a roller from a second clamp element clamping a stack of plies, according to one or more examples of the present disclosure.

Referring to FIGS. 8 and 9, cross sectional configurations of a left-side clamping assembly 114 are shown. The left-side clamping assembly 114 includes a first left-side clamp element 118 with a plurality of left-side rollers 132A and a left-side track 130A, and a second left-side clamp element 120 includes a plurality of left-side rollers 132A and a left-side track 130A. The stack of plies 110 is being fed in a feed direction, from the left side of the page to the right side of the page, between the first left-side clamp element 118 and the second left-side clamp element 120. As shown in FIG. 8, each left-side roller 134A of the plurality of left-side rollers 132A may by cylindrically shaped 136. Generally, each left-side roller 134A of the plurality will have a uniform shape both in circumference and length.

In some examples, it may be advantageous to have conically shaped 138 left-side rollers 134A, as shown in FIG. 9. If the stack of plies 110 is being shaped to have contours, the left-side rollers 134A and/or the left-side track 130A may cause mark-off or indentations on the stack of plies 110 at the left edge portion of the stack of plies 110 as the stack of plies 110 exits the left-side rollers 134A and/or left-side track 130A. Although this portion of the stack of plies 110 is generally trimmed off, it may still be undesirable to have indentations in the stack of plies 110 and in some cases may cause pinching in the stack of plies 110 that causes the left edge portion to fed unevenly with the remainder of the stack of plies 110 through the press unit 106. Accordingly, conically shaped 138 left-side rollers 134A, having an angle that correlates with the desired shape of the stack of plies 110 can be used, to avoid indentations on the left edge portion the stack of plies 110 as it exits the plurality of left-side rollers 132A.

The left-side rollers 134A on the first left-side clamp element 118 taper in a first direction. The left-side rollers 134A on the second left-side clamp element 120 taper in a second direction, that is opposite of the first direction. Accordingly, the left-side tracks 130A on the first left-side clamp element 118 and the second left-side clamp element 120 are both angled and in direct contact with the stack of plies 110 as it moves in the feed direction. The left-side tracks 130A may be attached to each left-side roller 134A of the plurality of left-side rollers 132A to stop the left-side track 130A from sliding off the plurality of left-side rollers 134A. In one example, each left-side roller 134A may have notches along the circumference of the left-side roller 134A. Protrusions may be included on the left-side track 130A that can be fitted within the notch and prevent the left-side track 130A for sliding off the plurality of left-side rollers 132A.

Figure 10:
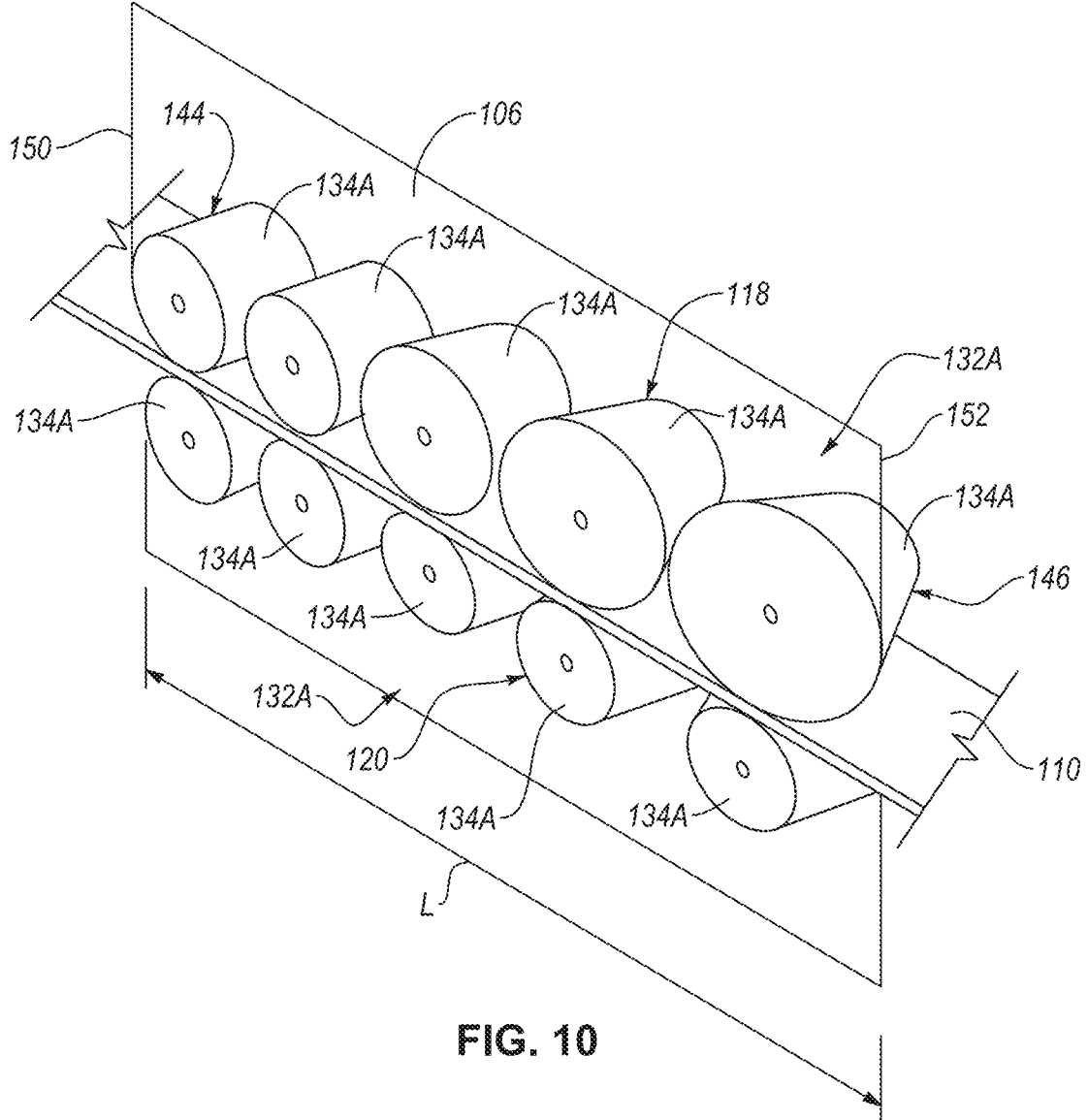
FIG. 10 is a schematic perspective view of a plurality of rollers from a first clamp element and a plurality of rollers from a second clamp element clamping a stack of plies, according to one or more examples of the present disclosure.

Referring to FIG. 10, the shape of the left-side rollers 134A can vary along the length of the left-side clamping assembly 114. The left-side roller 134A nearest the entry side 150 of the press unit 106 has a first taper angle 144. The first taper angle has an angle equal to or closest to 0° of any of the taper angles of the remaining rollers. The taper angle of the remaining rollers 134A of the plurality of left-side rollers 132A gradually change along the length L of the left-side clamping assembly 114. The left-side rollers 134A nearest the exit side 152 of the press unit 106 has a final taper angle 146. The final taper angle 146 has an angle that is the most severe of the remaining left-side rollers 134A of the plurality of left-side rollers 132A. This implementation of rollers may be useful in cases where the shape of the stack of plies 110 is gradually changed from a flat sheet to a sheet with contours along the length L1 of the press unit 106 or the length of the pre-heating/pre-forming unit 104 and the press unit 106, depending on the layout of the CCM. Accordingly, the taper angle of the left-side rollers 134A can be changed, from the first taper angle 144 to the final taper angle 146 as the stack of plies 110 changes from a first shape to a second shape in the feed direction. The first shape can either have a flat shape or minimal contours and the second shape having greater contours than the first shape. The angle of the left-side rollers 134A in the plurality of left-side rollers 132A would ideally correlate with the angle of the stack of plies 110 at the left side portion of the stack of plies 110 at any point along the stack of plies 110. In some examples, individual ones of the left-side rollers 134A may need to be adjusted to change a distance D2 of the individual ones of the left-side rollers 134A toward or away from the stack of plies 110 in order to keep the outside edge (i.e., the edge of the rollers that is closest to the press unit) of the left-side rollers 134A linear with each other as the taper angle of the left-side rollers 134A changes.

Now referring to FIG. 11, according to certain examples, a method 300 for continuous compression molding of a stack of plies 110 is shown. The method 300 is performed using any one or more of the examples of the system 100 or the system 200 disclosed herein. The method 300 includes (block 302) feeding a stack of plies 110 in a feed direction at an entry side 150 of a press unit 106 to an exit side 152 of the press unit 106. The stack of plies 110 is fed between a first left-side clamp element 118 and a second left-side clamp element 120 of a left-side clamping assembly 114 and between a first right-side clamp element 122 and a second right-side clamp element 124 of a right-side clamping assembly 116. The method 300 also includes (block 304) pressing at least one set of opposing dies 108 of the press unit 106 together against the stack of plies 110, as the stack of plies 110 is fed in the feed direction. The complimentary forming surfaces of the at least one set of opposing dies 108 shaping the stack of plies 110 as it is fed in the feed direction. The method 300 additionally includes (block 306) clamping a left edge portion of the stack of plies 110 between the first left-side clamp element 118 and the second left-side clamp element 120 and clamping a right edge portion of the stack of plies 110 between the first right-side clamp element 122 and the second right-side clamp element 124 as the stack of plies 110 is fed in the feed direction. The tension in the stack of plies 110 is maintained as the stack of plies 110 is shaped by the at least one set of opposing dies 108.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface, and vice versa, simply by turning the object over. As another example, with respect to an object, a "left" side can become a "right", and vice versa, simply by rotating the object or observing the object from an opposite perspective. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described examples are to be considered in all respects only as illustrative and not restrictive. All changes which come within the meaning and range of equivalency of the claims are to be embraced within their scope.

What is claimed is:

1. A method for continuous compression molding of a stack of plies, the method comprising:

feeding a stack of plies in a feed direction between a first left-side clamp element and a second left-side clamp element of a left-side clamping assembly and between a first right-side clamp element and a second right-side clamp element of a right-side clamping assembly at an entry side of a press unit to an exit side of the press unit;

pressing opposing dies of the press unit together against the stack of plies, as the stack of plies is fed in the feed direction, such that complimentary forming surfaces of the opposing dies shape the stack of plies as the stack of plies is fed in the feed direction; and continuously clamping a left edge portion of the stack of plies between the first left-side clamp element and the second left-side clamp element and clamping a right edge portion of the stack of plies between the first right-side clamp element and the second right-side clamp element as the left edge portion and the right edge portion of the stack of plies is fed in the feed direction into and through the opposing dies such that tension in the stack of plies is maintained as the stack of plies is shaped by the opposing dies;

wherein:

at least one of the first left-side clamp element and the second left-side clamp element comprises a plurality of left-side rollers and a left-side track that is frictionally engageable with the left edge portion of the stack of plies and movable along the plurality of left-side rollers when frictionally engaged with the left edge portion of the stack of plies; and at least one of the first right-side clamp element and the second right-side clamp element comprises a plurality of right-side rollers and a right-side track that is frictionally engageable with the right edge portion of the stack of plies and movable along the plurality of right-side rollers when frictionally engaged with the right edge portion of the stack of plies.

2. The method of claim 1, further comprising:

adjusting at least one of a distance or a pressure between the first left-side clamp element and the second left-side clamp element to adjust the tension in the stack of plies; and adjusting at least one of a distance or a pressure between the first right-side clamp element and the second right-side clamp element to adjust the tension in the stack of plies.

3. The method of claim 2, wherein:

both the distance and the pressure are adjusted between the first left-side clamp element and the second left-side clamp element to adjust the tension in the stack of plies; and both the distance and the pressure are adjusted between the first right-side clamp element and the second right-side clamp element to adjust the tension in the stack of plies.

4. The method of claim 1, wherein:

each one of the first left-side clamp element and the second left-side clamp element comprises the plurality of left-side rollers and the left-side track that is frictionally engageable with the left edge portion of the stack of plies and movable along the plurality of left-side rollers when frictionally engaged with the left edge portion of the stack of plies;

each roller of the plurality of left-side rollers is individually and selectively movable;

each one of the first right-side clamp element and the second right-side clamp element comprises the plurality of right-side rollers and the right-side track that is frictionally engageable with the right edge portion of the stack of plies and movable along the plurality of right-side rollers when frictionally engaged with the right edge portion of the stack of plies;

each roller of the plurality of right-side rollers are individually and selectively movable;

the method further comprises adjusting at least one of a distance of at least one roller from any of the plurality of left-side rollers toward or away from the stack of plies or a pressure between the at least one roller and the stack of plies to adjust the tension in the stack of plies; and the method further comprises adjusting at least one of a distance of at least one roller from any of the plurality of right-side rollers toward or away from the stack of plies or a pressure between the at least one roller and the stack of plies to adjust the tension in the stack of plies.

5. The method of claim 4, wherein the rollers of the plurality of left-side rollers and the rollers of the plurality of right-side rollers vary in shape and size along the left-side clamping assembly and the right-side clamping assembly, respectively.

6. The method of claim 1, further comprising trimming off at least a portion of the stack of plies fed through the left-side clamping assembly and the right-side clamping assembly to form a part.

7. The method of claim 1, wherein:

the first left-side clamp element comprises the plurality of left side rollers and the left side track, and the second left-side clamp element comprises a left-side fixed surface;

the first right-side clamp element comprises the plurality of right-side rollers and the right side track, and the second right-side clamp element comprises a right-side fixed surface;

the step of clamping the left edge portion of the stack of plies comprises clamping the left edge portion of the stack of plies between the left-side track and the left-side fixed surface; and the step of clamping the right edge portion of the stack of plies comprises clamping the right edge portion of the stack of plies between the right-side track and the right-side fixed surface.

8. The method of claim 1, wherein:

at least one roller, located nearest to the entry side of the press unit, on the left-side clamping assembly is offset from the remaining rollers of the plurality of left-side rollers, the remaining rollers of the plurality located closer than the at least one roller to the stack of plies; and at least one roller, located nearest to the entry side of the press unit, on the right-side clamping assembly is offset from the remaining rollers of the plurality of right-side rollers, the remaining rollers of the plurality located closer than the at least one roller to the stack of plies.

9. The method of claim 8, wherein:

each roller of the plurality of left-side rollers of the at least one of the first left-side clamp element and the second left-side clamp element is conically shaped and is tapered; and each roller of the plurality of right-side rollers of the at least one first right-side clamp element and the second left-side clamp element is conically shaped and is tapered.

10. The method of claim 1, wherein:

each roller of the plurality of left-side rollers of the at least one of the first left-side clamp element and the second left-side clamp element is conically shaped and is tapered; and each roller of the plurality of right-side rollers of the at least one of the first right-side clamp element and the second right-side clamp element is conically shaped and is tapered.

11. The method of claim 1, wherein each roller of the plurality of left-side rollers and each roller of the plurality of right-side rollers is cylindrically shaped.

12. The method of claim 1, wherein the rollers of the plurality of left-side rollers and the rollers of the plurality of right-side rollers are uniformly sized.

13. The method of claim 1, wherein:

the first left-side clamp element and the second left-side clamp element are selectively movable to adjust at least one of a distance or a pressure between each other; and the first right-side clamp element and the second right-side clamp element are selectively movable to adjust at least one of a distance or a pressure between each other.

14. The method of claim 1, further comprising:

selectively pivoting the left-side clamping assembly relative to the press unit to adjust an angle of the left-side clamping assembly relative to the stack of plies; and selectively pivoting the right-side clamping assembly relative to the press unit to adjust an angle of the right-side clamping assembly relative to the stack of plies.

15. The method of claim 1, wherein the first left-side clamp element and the second left-side clamp element are spaced relative to each other to clamp down on the left edge portion of the stack of plies when the stack of plies moves in the feed direction and is shaped between the opposing dies, and wherein the first right-side clamp element and the second right-side clamp element are spaced relative to each other to clamp down on the right edge portion of the stack of plies when the stack of plies moves in the feed direction and is shaped between the opposing dies.

16. The method of claim 1, further comprising:
selectively moving the left-side clamping assembly relative to the press unit to adjust a location of the left-side clamping assembly relative to the opposing dies; and
selectively moving the right-side clamping assembly relative to the press unit to adjust a location of the right-side clamping assembly relative to the opposing dies.

17. The method of claim 1, wherein:
the left-side clamping assembly and the right-side clamping assembly extend parallel to each other along at least a length of the press unit; and
the left-side clamping assembly is spaced apart from the right-side clamping assembly by at least a width of the opposing dies.

18. A method for continuous compression molding of a stack of plies, the method comprising:
feeding a stack of plies in a feed direction between a first left-side clamp element and a second left-side clamp element of a left-side clamping assembly and between a first right-side clamp element and a second right-side clamp element of a right-side clamping assembly at an entry side of a press unit to an exit side of the press unit;
pressing opposing dies of the press unit together against the stack of plies, as the stack of plies is fed in the feed direction, such that complimentary forming surfaces of the opposing dies shape the stack of plies as the stack of plies is fed in the feed direction; and
clamping a left edge portion of the stack of plies between the first left-side clamp element and the second left-side clamp element and clamping a right edge portion of the stack of plies between the first right-side clamp element and the second right-side clamp element as the stack of plies is fed in the feed direction such that tension in the stack of plies is maintained as the stack of plies is shaped by the opposing dies;
wherein:
at least one of the first left-side clamp element and the second left-side clamp element comprises a plurality of left-side rollers and a left-side track that is frictionally engageable with the left edge portion of the stack of plies and movable along the plurality of left-side rollers when frictionally engaged with the left edge portion of the stack of plies;
at least one of the first right-side clamp element and the second right-side clamp element comprises a plurality of right-side rollers and a right-side track that is frictionally engageable with the right edge portion of the stack of plies and movable along the plurality of right-side rollers when frictionally engaged with the right edge portion of the stack of plies;

each roller of the plurality of left-side rollers is individually and selectively movable to adjust at least one of a distance of the roller toward or away from the stack of plies or a pressure between the rollers and the stack of plies; and
each roller of the plurality of right-side rollers is individually and selectively movable to adjust at least one of a distance of the roller toward or away from the stack of plies or a pressure between the rollers and the stack of plies.

19. A method for continuous compression molding of a stack of plies, the method comprising:
feeding a stack of plies in a feed direction between a first left-side clamp element and a second left-side clamp element of a left-side clamping assembly and between a first right-side clamp element and a second right-side clamp element of a right-side clamping assembly at an entry side of a press unit to an exit side of the press unit;
pressing opposing dies of the press unit together against the stack of plies, as the stack of plies is fed in the feed direction, such that complimentary forming surfaces of the opposing dies shape the stack of plies as the stack of plies is fed in the feed direction; and
clamping a left edge portion of the stack of plies between the first left-side clamp element and the second left-side clamp element and clamping a right edge portion of the stack of plies between the first right-side clamp element and the second right-side clamp element as the stack of plies is fed in the feed direction such that tension in the stack of plies is maintained as the stack of plies is shaped by the opposing dies;
wherein:
at least one of the first left-side clamp element and the second left-side clamp element comprises a plurality of left-side rollers and a left-side track that is frictionally engageable with the left edge portion of the stack of plies and movable along the plurality of left-side rollers when frictionally engaged with the left edge portion of the stack of plies; and
at least one of the first right-side clamp element and the second right-side clamp element comprises a plurality of right-side rollers and a right-side track that is frictionally engageable with the right edge portion of the stack of plies and movable along the plurality of right-side rollers when frictionally engaged with the right edge portion of the stack of plies, wherein the right-side track is continuous, flexible, and defines a loop about the plurality of right-side rollers.

20. The method of claim 19, wherein
the left-side track is continuous, flexible, and defines a loop about the plurality of left-side rollers.

* * * * *